Feb. 21, 1933. O. C. K. HUTCHINSON ET AL 1,898,449
ARTICLE TRANSFER MECHANISM
Filed Dec. 2, 1929 5 Sheets-Sheet 4
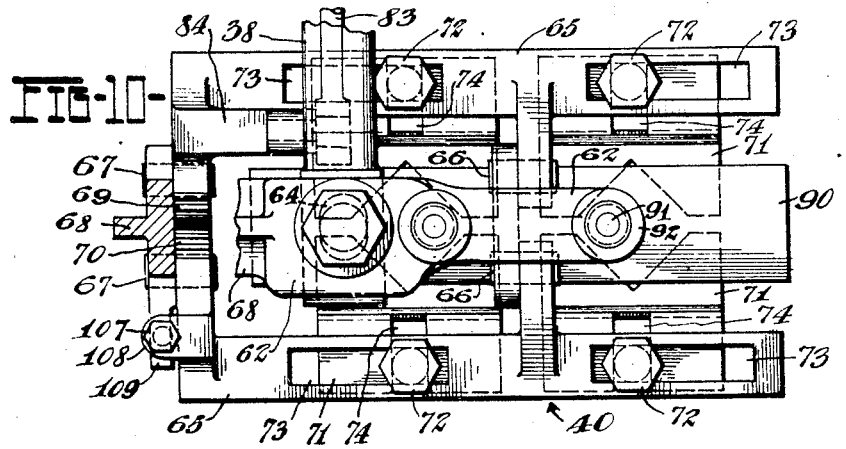
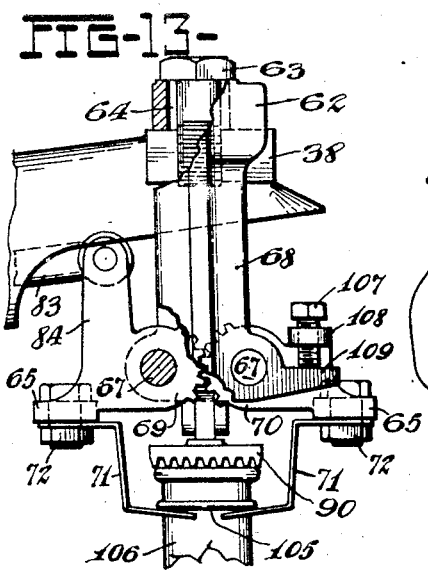
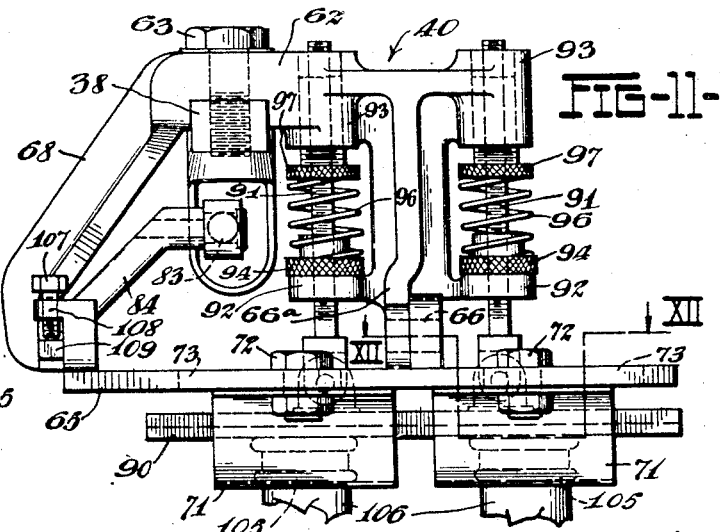
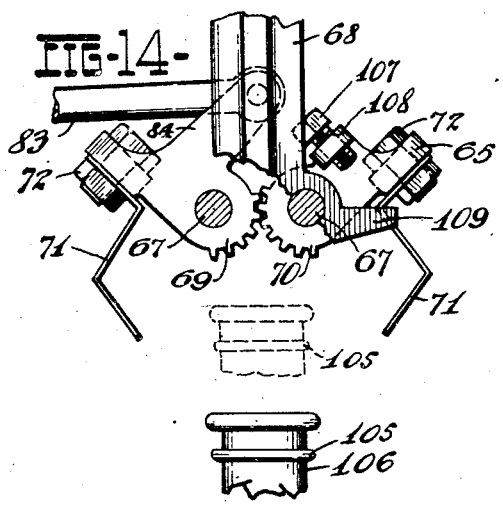
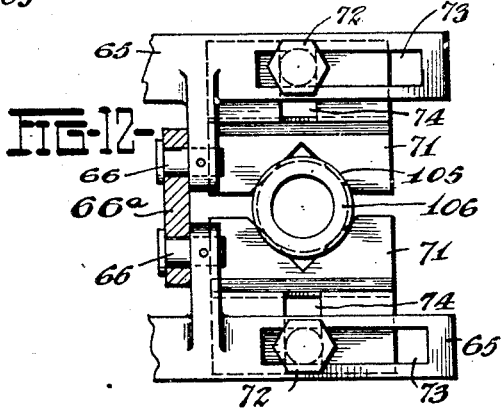

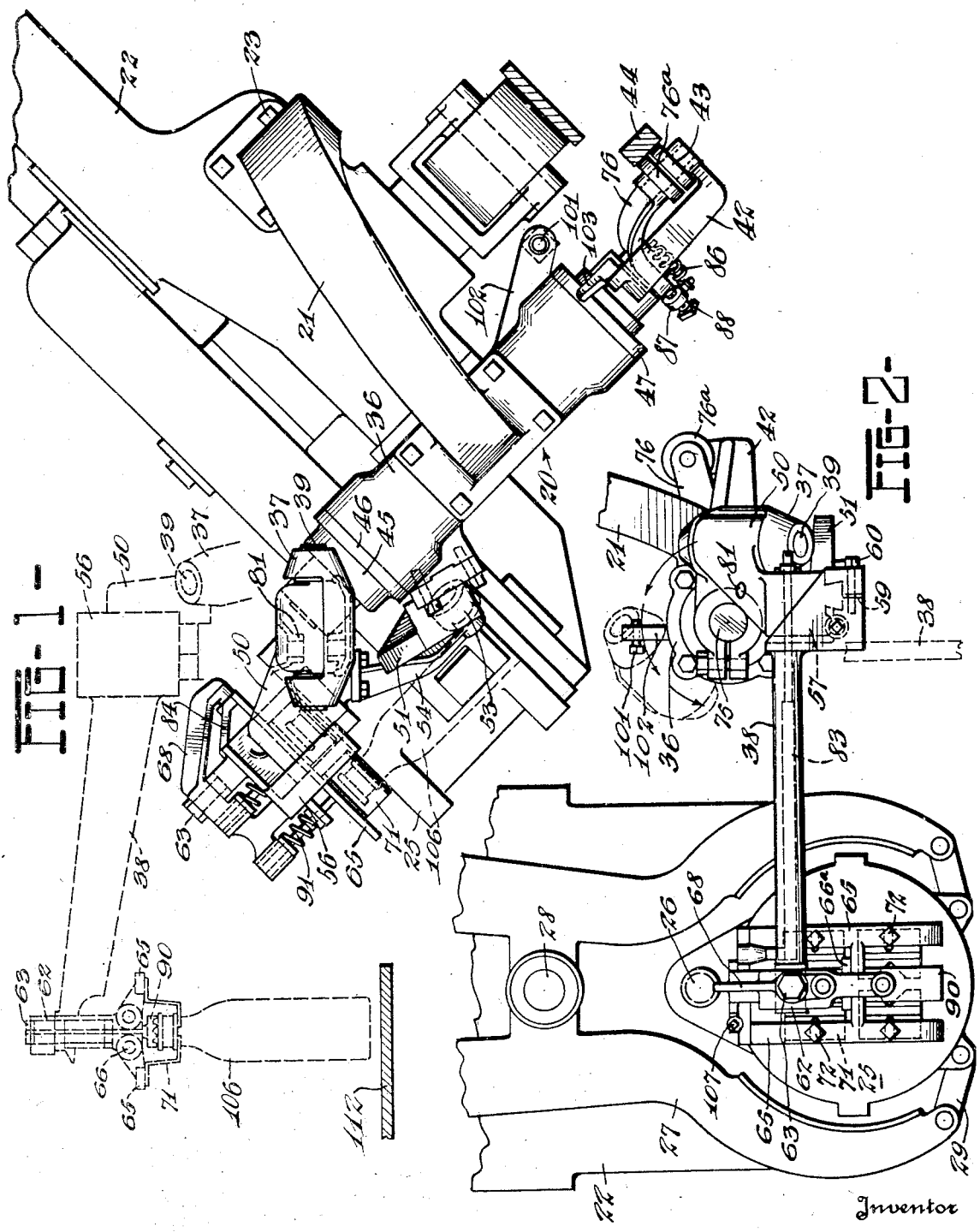

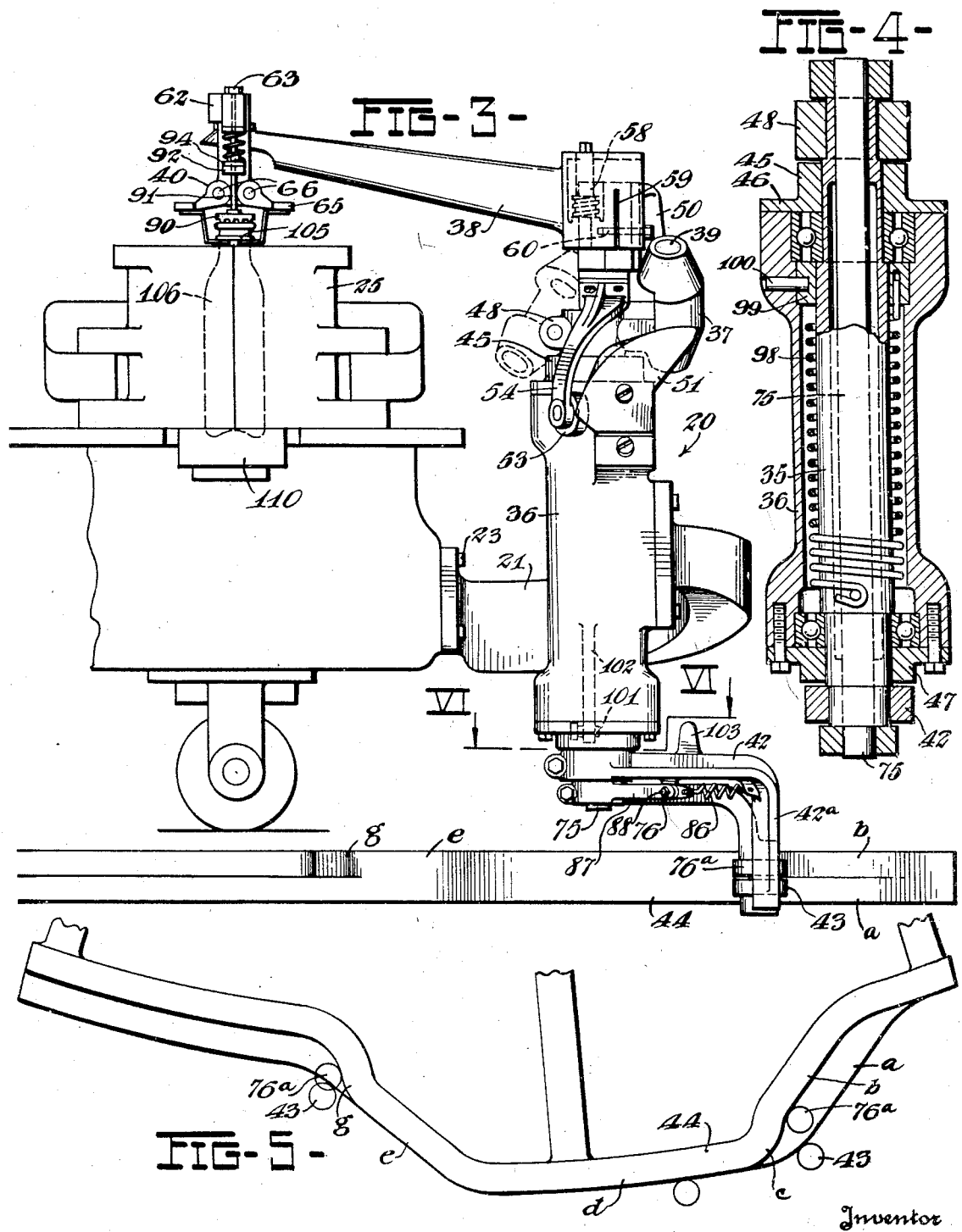

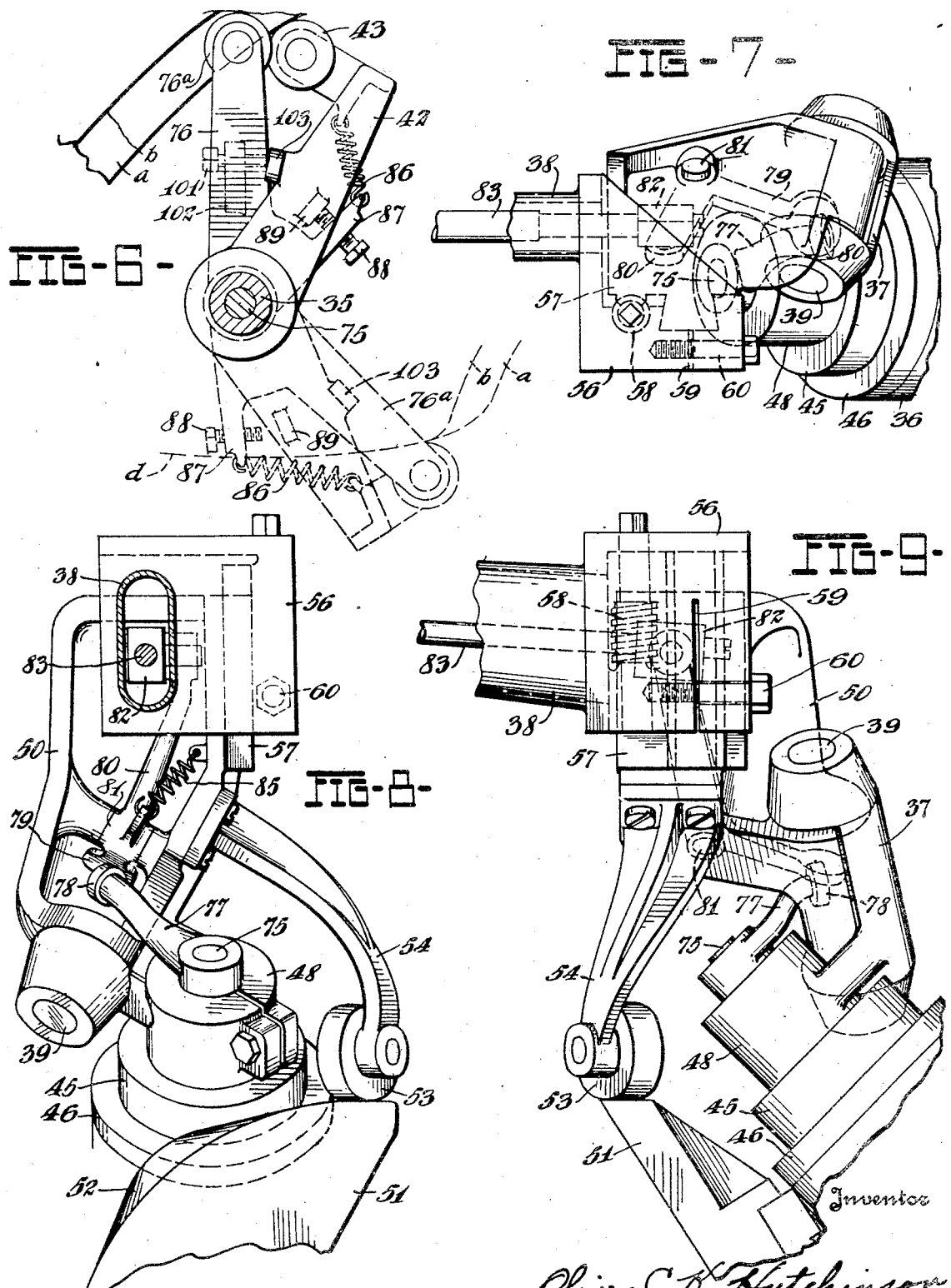

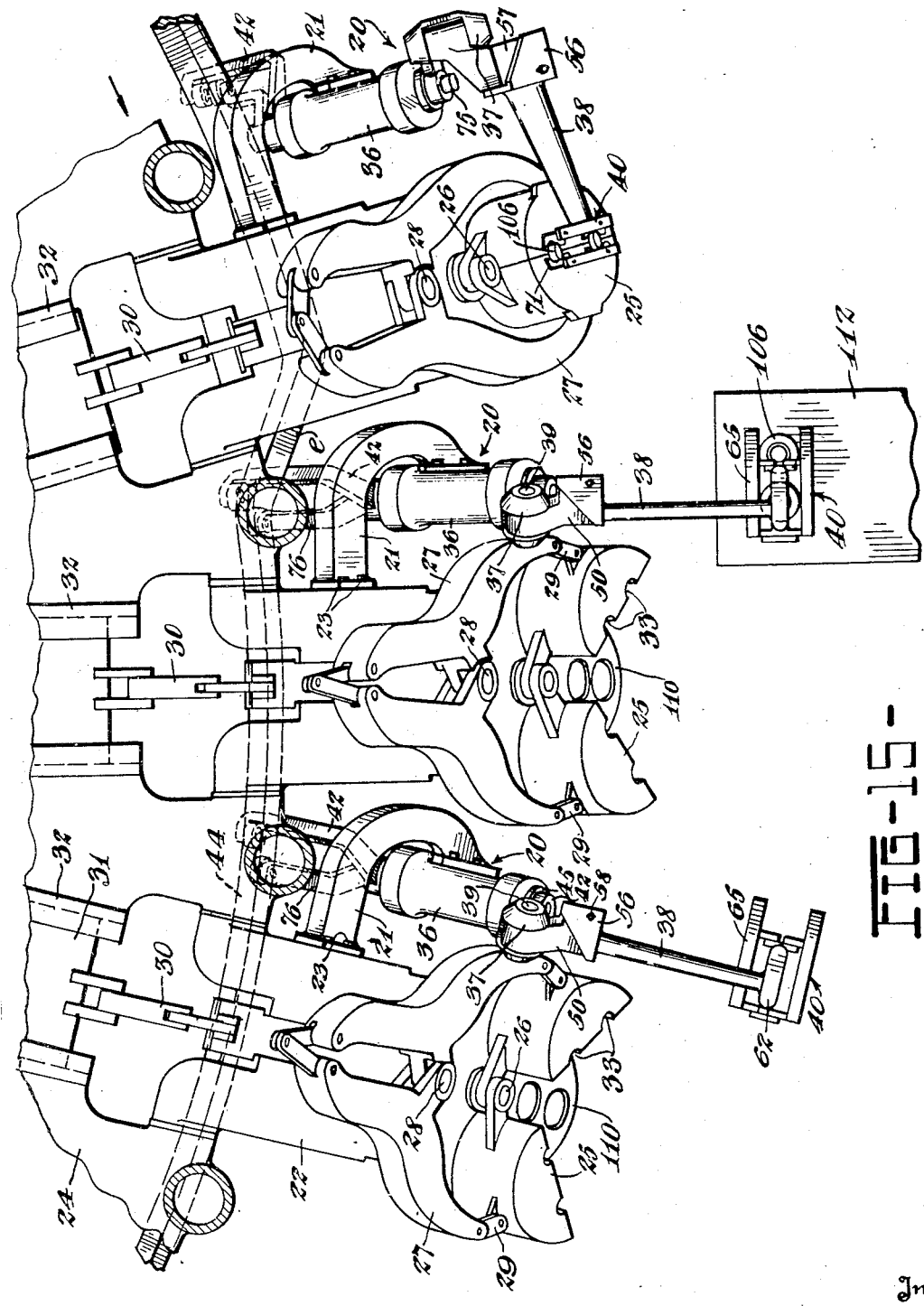

Patented Feb. 21, 1933

1,898,449

UNITED STATES PATENT OFFICE

OLIVER C. K. HUTCHINSON AND WILLARD C. GILLHAM, OF ALTON, ILLINOIS, ASSIGNORS TO OWENS-ILLINOIS GLASS COMPANY, OF TOLEDO, OHIO, A CORPORATION OF OHIO

ARTICLE TRANSFER MECHANISM

Application filed December 2, 1929. Serial No. 411,006.

Our invention relates to mechanism for taking bottles or other articles from the molds of a forming machine and transferring them to a support or carrier separate from the machine. The transfer apparatus herein shown is adapted for use with a glass blowing machine of the type in which the bottles or other blown articles are discharged from the finishing molds while the latter are traveling and are in a downwardly and outwardly inclined position, the particular machine shown in the drawings being an Owens type of suction gathering machine. The invention, however, may be used with various other types of machines.

An object of the invention is to provide transfer mechanism of the character indicated which will handle the glass articles in a gentle manner to prevent scratching, marring or distortion of the articles which are in a comparatively soft and plastic condition at the time they are discharged from the molds.

A further object of the invention is to provide suitable mechanism adapted to take articles from the traveling molds of a machine such as indicated, while the molds are in an inclined position, and place them in an upright position on a stationary support, traveling conveyor, or other receiving device.

A feature of the invention consists in providing a transfer mechanism in which the article holding means or gripping jaws with the article held therein have imparted thereto a movement relative to the mold carriage which, at the moment the article is released, is in a direction and at a speed to counteract or compensate for the forward movement of the mold carriage, so that the article is practically stationary at the instant it is released from the gripping jaws or holding means.

Other objects of the invention will appear hereinafter.

In the accompanying drawings:

Fig. 1 is a side elevation of a portion of a bottle blowing machine including a finishing mold and its carrying frame, and a bottle transfer apparatus mounted on said frame.

Fig. 2 is a top view of parts shown in Fig. 1, looking in a direction perpendicular to the inclined plane of the mold carriage.

Fig. 3 is a front view of the same, looking in a direction parallel with the plane of the mold carriage.

Fig. 4 is a sectional view showing the main rock shaft of the transfer mechanism.

Fig. 5 is a top view of the stationary cams controlling the movements of the transfer mechanism.

Fig. 6 is a section at the line VI—VI on Fig. 3.

Fig. 7 is a fragmentary top plan view of the upper portion of the main rock shaft and appurtenant parts.

Fig. 8 is an elevation view of the parts shown in Fig. 7.

Fig. 9 is a view of the parts shown in Fig. 8, looking in a direction at right angles to that of Fig. 8.

Figs. 10 to 14, inclusive, are detail views of the article gripping or holding mechanism. Fig. 10 is a plan view, and Fig. 11 an elevation of such mechanism. Fig. 12 is a sectional plan as indicated by the line XII—XII on Fig. 11. Fig. 13 is an end elevation of the mechanism shown in Fig. 11, parts being shown in section and parts broken away. Fig. 14 is a view of the parts shown in Fig. 13, but with the gripping jaws in open position.

Fig. 15 is a fragmentary plan view of a portion of the finishing mold carriage of an article forming machine, showing several of the finishing molds and associated transfer devices.

Referring particularly to Figs. 1, 2, 3 and 15 of the accompanying drawings, the transfer mechanisms 20 are carried on brackets 21 removably attached by means of bolts 23 to the finishing mold frames 22 of a bottle forming machine. This machine is of the well known Owens suction type and comprises a mold carriage 24 which rotates continuously about a vertical axis. An annular series of finishing molds 25 are supported on the frames 22 which are mounted for up and down swinging movement on the carriage, whereby the frames 22 with the molds thereon can be swung from a horizontal position to the downwardly and outwardly inclined position shown in Fig. 1.

Each finishing mold as shown comprises a pair of separable sections mounted to swing on a hinge pin 26 for opening and closing the mold. The mechanism for opening and closing the mold comprises a pair of levers 27 pivotally connected at 28 and connected through links 29 to the mold sections. The levers 27 have operating connections 30 with a cam actuated slide block 31 mounted to reciprocate radially of the machine in guides 32. Each of the mold sections as shown is provided with a plurality of mold cavities 33 so that a plurality of bottles or other articles may be blown simultaneously in each mold. It will be understood that the take-out mechanism may also be adapted either for single molds in which only one article is blown at a time, or molds having a larger number of mold cavities than herein shown.

The transfer devices are individual to the finishing molds and are identical in construction. Each transfer device comprises in general a main rock shaft 35 (Fig. 4) which is tubular and mounted to oscillate in the casing 36, a bearing bracket 37 secured to the upper end of the rock shaft 35 to rock therewith, a frame 50 having a pivotal connection by means of inclined pivot pins 39 with the bracket 37, a rock arm 38 carried on the frame 50, an article gripping device 40 carried at the outer end of the rock arm 38, and cam actuated devices for rocking the shaft 35 and for actuating the gripping device 40.

The tubular rock shaft 35, as shown in Fig. 4, extends lengthwise through the casing 36, the ends of the shaft protruding above and below the casing. A rock arm 42 is secured to the lower end of the shaft 35, said arm comprising a horizontal section extending outward from the shaft and section 42a extending vertically downward therefrom and carrying at its lower end a cam roll 43 which runs on a stationary cam track 44. A cap 45 formed with an annular flange 46 is secured to the upper end of the casing. An end plate 47 is provided at the lower end of the casing.

The bearing bracket 37 has a fixed connection with the rock shaft 35 by means of a collar 48 formed integrally with said bracket and mounted on the shaft 35 just above the cap 45. Mounted to swing on the bracket 37 is a frame 50 which is connected to said bracket by means of the pivot pins 39. The swinging movements of the frame 50 about the axis of the pivots 39 are controlled by a cam plate 51 secured to the casing 36, said plate having a cam surface 52 on which runs a cam roll 53 carried by an arm 54 secured to the bracket 37. It will be seen that with this construction, rotation of the rock shaft 35 will cause the cam roll 53 to travel up and down along the cam surface 52, thereby swinging the frame 50 and with it the rock arm 38 about the more or less inclined axis of the pivots 39. The shaft 35 as it rocks, carries with it the bearing bracket 37, and as the axis of the pivots 39 is inclined to the axis of the rock shaft 35, the direction in which the axis of said pivots extends will continually change while the shaft 35 is rotating. This change in direction is transmitted to the rock arm 38 which at the same time is swinging about the axis of the pivots 39 under the control of the cam 52. The movement imparted to the rock arm 38 by the rotation of the main rock shaft 35, may be considered as a compound movement which is the component of its rotating movement about the axis of the main rock shaft 35 and its swinging movement about the axis of the pivot pins 39, the rate and extent of such swinging movement being determined by the shape of the cam 52. The operation of this mechanism and the purpose of these movements will be more fully explained hereinafter.

The rock arm 38 is adjustable bodily up and down on the frame 50. To provide for such adjustment, the rock arm is formed with a head 56 mounted for up and down movement on a guide plate 57 formed on the frame 50, said head and plate having a dovetail connection. Adjustment is effected by means of an adjusting screw 58 journaled in the head 56, said screw engaging threads in plate 57. The screw shaft 58 is formed with a squared head to receive a wrench for rotating the screw and thereby adjusting the arm 38 up or down. The head 56 is slotted at 59, and a clamping bolt 60 serves to clamp the parts in adjusted position.

The article gripping device 40, which is shown in detail in Figs. 10 to 14, will now be described. This device comprises a bracket 62 secured to the outer end of the rock arm 38 by means of a bolt 63 which extends through said bracket and has a screw threaded engagement with the arm 38. The opening 64 (Fig. 13) through which the clamping bolt extends is elongated to permit adjustment of the gripping device lengthwise of the rock arm.

A pair of horizontally disposed gripper plates 65 are pivotally connected to the bracket 62 by pivot pins 66 and 67. The pivot pins 66 extend through bearing lugs formed respectively on the plates 65 and the vertically disposed arm 66a of the bracket 62. The pivot pins 67 are connected to bearing lugs at the lower end of an inclined arm 68 of the bracket 62. The plates 65 are formed with bearing lugs 69 and 70 for the pivot pins 67, said lugs being formed with intermeshing gear segments. Gripping jaws 71 are secured to the undersurface of the plates 65 by means of clamping bolts 72 which extend through slots 73 in the plates 65 and through slots 74 in the gripping jaws. The slots 73 extend lengthwise of the plates 65, and slots 74 extend in a direction at right angles to the slots 73, thus permitting adjustment of the gripping jaws horizontally in any direction.

The opening and closing movements of the gripping jaws 71 are controlled by a stationary cam formed on the cam track 44 and operating through the following mechanism.

Extending through the hollow shaft 35 is a spindle 75, to the lower end of which is secured the rock arm 76. The outer end of said arm extends downward and carries a cam roll 76ª which runs on the upper portion of the cam track 44. Fixed to the upper end of the spindle 75 is a rock arm 77 (see Figs. 8 and 9). The outer end of the arm 77 carries a roll 78 which bears against an arm 79 of a bell crank lever 80, having a pivotal connection 81 with the frame 50. The other arm of the bell crank lever 80 is pivoted to a bearing block 82 rotatably mounted on the end of a rod 83. There is thus provided a universal joint connection between the bell crank and the rod 83 which extends lengthwise through the rock arm 38, the latter being made hollow to accommodate said rod.

The outer end of the rod 83 is pivoted to an arm 84 (see Figs. 11, 13 and 14) on one of the clamping plates 65. A spring 85 (Fig. 8) holds the arm 79 in contact with the roll 78 and serves to hold the cam roll 76ª in operative relation to its cam. It will be noted that the point of contact between the roll 78 and arm 79 is substantially in line with the pivots 39, so that rotation of the frame 50 about the axis of the pivots 39 will not interfere with the operating connections between the arms 77 and 79. A spring 86 (Figs. 3 and 6) is connected at one end to a lug 87 formed on the rock arm 76, and its other end is connected to a lug on the rock arm 42. A stop screw 88 is adjustable in the lug 87 and adapted to engage a stop lug 89 formed on the lower side of the rock arm 42. The spring 86 tends to hold the stop screw 88 against the lug 89 and thereby to hold the two rock arms 42 and 76 in a predetermined position for purposes which appear hereinafter.

As the bottles or other blown articles are in an inclined position during a portion of the time they are held by the gripping jaws 71, there is a tendency for said articles to swing by gravity to a vertical position, thus tending to twist or move the articles out of position in the gripping jaws. In order to counteract this tendency, a holding plate or stabilizer 90 is provided to engage the upper surfaces of the articles and cooperate with the jaws 71 to hold the articles in position. The stabilizer 90 is located beneath and extends lengthwise of the plates 65. The under surface of said plate may be provided with longitudinal ribs or corrugations as shown, to assist in holding articles. The stabilizer is carried by vertical rods 91 which are pivotally connected at their lower ends to the stabilizer and extend upward through lugs 92 and 93 formed on the bracket 62. Adjusting nuts 94 have a screw threaded connection with the rods 91 and are seated on the lugs 92, thus limiting the downward movement of the stabilizer plate. By rotating the nuts 94, said plate can be adjusted up or down. The stabilizer is yieldingly held in its downward position by springs 96 which bear at their lower ends on the adjusting nuts 94, and at their upper ends bear against adjusting nuts 97 which are screw threaded into the lugs 93. The adjusting nuts 97 provide means for adjusting the tension of the springs 96.

The rotative positions of the rock shaft 35 and spindle 75 (Fig. 4) when out of the influence of the cam 44, are controlled by a torsion spring 98 connected at its lower end to the rock shaft and at its upper end to a sleeve 99 keyed to the casing by a pin 100. This spring rotates the rock shaft so as to swing the rock arm 38 and gripping device 40 away from the mold to an inoperative position, the limit of this swinging movement being determined by a stop screw 101 (Figs. 1, 3 and 6) adjustably mounted in an arm 102 on the casing 36, said stop screw being located in the path of a lug 103 formed on the rock arm 42.

The operation is as follows:

The mold carriage 24 (Fig. 15) is rotating continuously in a clockwise direction as indicated by the arrow. Each take-out device is held in its inoperative position except while under the control of the stationary cam track 44 (Figs. 3 and 5). The rock arms 42 and 76 are at this time (while the rock arm 76 is free from its cam) held in the relative positions shown in full lines (Fig. 6) determined by the stops 88 and 89. As a mold 25 approaches its bottle discharging position, a corresponding take-out device is brought into operation by engagement of its cam roll 43 with the cam track 44. The roll 43 now runs on the lower inclined section *a* of the cam track and swings the rock arm 76 outward, thereby rocking the shaft 35 and with it the bearing bracket 37 which carries the frame 50 and the rock arm 38, so that said arm swings inward toward the mold, carrying with it the gripping device 40. This rotative movement of the frame 50 with the rock shaft 35 causes the cam roll 53 carried by said frame to move along the downwardly inclined cam surface 52. The weight of the frame 50 and parts carried thereby, holds the roll 53 on its cam so that the frame swings in a downwardly inclined direction about the axis of the pivot pins 39 which connect said frame with the bracket 37. The rock arm 38 is in this manner given a downward swinging movement in addition to its inward rotative movement with the rock shaft 35. The resultant of these movements is such that the gripping device 40 is carried to a position directly over the mold 25.

During the greater portion of this inward movement of the transfer arm, the gripping jaws remain in their open position, shown in Fig. 14, as the cam section $b$ on which the roll 76$^a$ runs during this swinging movement does not at this time affect the arm 76. As the rock arm completes its inward swinging movement, the cam roll 76$^a$ engages the cam section $c$ and rocks the arm 76 in an outward direction, bringing the parts to the position shown in broken lines on Fig. 6. This rocking movement of the arm 76 rocks the spindle 75 and causes the rock arm 77 at the upper end thereof to swing outward with respect to the arm 79 (Fig. 8) of the bell crank 80. The bell crank, however, under the influence of the spring 85 follows the rock arm 77 and thereby pulls the rod 83 in the direction of its length. This swings the gripping jaws 71 from the open position (Fig. 14) to a gripping position (Figs. 12 and 13) in which the jaws engage beneath the usual flange 105 formed on the neck of the bottle 106.

The inward movement of the gripping jaws is limited by a stop screw 107 threaded in a lug 108 formed on one of the gripper plates 65 and arranged to engage a stop lug 109 formed on the lower end of the inclined arm 68. By adjusting the screw 107 the jaws can be adapted to engage bottles or articles of different sizes. It will be noted that the spring 85 serves as a safety device permitting the jaws 71 to yield in the event of any obstruction being placed in their path and also preventing undue pressure on the bottle necks.

As the gripping device 40 is brought to position over the bottle, the stabilizing plate 90 seats on the upper end surface of the bottle, being held thereon with a yielding pressure determined by the adjustment of the springs 96. If desired, the plate 90 may be so adjusted that the stop screws 94 seat on the lugs 92 while said plate is in engagement with the bottle (see Figs. 11 and 13). It will be apparent that when the gripping jaws are brought into engagement with the bottle, the latter is clamped between said jaws and the stabilizing plate in a manner to securely hold it against tilting movement relative to said plate.

The gripping device takes hold of the bottle neck which protrudes above the finishing mold, just before the latter commences to open. As the mold opens the bottle is left standing on the mold bottom 110 with the upper end of the bottle held in the gripping device 40. At this time the cam rolls 43 and 76$^a$ are traveling along the dwell portion $d$ of the cam track. After the mold has opened, the cam rolls engage an inwardly inclined portion $e$ of the cam track, thereby permitting the arm 70 to be rocked inwardly under the influence of the spring 98 (Fig. 4), thus swinging the rock arm 38 with the gripping device upwardly and outwardly. This movement is the reverse of that which took place while the cam roll 43 was traveling on the track section $a$, except that the track section $e$ does not permit inward movement of the roll 76$^a$ relative to the roll 43, and the gripping jaws are therefore held closed and lift the bottle off the mold bottom and swing it outwardly to the discharge position. It is to be noted that the initial movement of the gripping device 40 after taking hold of a bottle, is in an upward direction substantially lengthwise of the axis of the bottle, thereby lifting the latter off the mold bottom before it commences to swing outward.

This initial movement may be explained by the fact that the axis of the pivots 39 is so inclined that the movement of the rock arm 38 about such axis is at first upward and inward with respect to the bracket 37, while the movement of said bracket 37 about the inclined axis of the rock shaft 35 tends to swing the arm 38 outward. The resultant of these two movements is an initial upward movement in a direction lengthwise of the bottle axis. This direction of movement, however, gradually changes, owing in part to the change in the direction of the axis of the pivots 39 as the latter travel around the axis of the rock shaft 35. The cam track 52 is another factor determining the rate of change in direction of movement of the gripping device. Said cam is designed to effect the movements above described, including first the endwise movement of the bottle and then the outward swinging movement.

It will be noted that when the bottle is first lifted off the mold bottom it is in an inclined position in which the bottle extends outwardly and upwardly from the mold bottom. The outward swinging movement, however, of the rock arm 38 to the point of discharge brings the bottle to an upright position, said position of the arm 38 and bottle being indicated in broken lines in Fig. 1. It is to be further noted that the swinging movement of the rock arm 38 relative to the mold carriage is in a direction substantially opposite to the direction of travel of said arm with the mold carriage. The parts are so designed that the gripping device 40 when it reaches the discharging position is moving backward with respect to the mold carriage at substantially the same speed as it would be moving forward if in fixed relation to the carriage. As a result, the bottle at the instant it is released from the gripping device is practically stationary. The bottle can thus be released and permitted to drop a short distance onto a support 112 (Fig. 1) without any tendency to tip over. The cam track and other parts of the mechanism are so designed that the speed and direction of movement of the rock arm 38 will effect the above operation.

The opening movement of the gripping jaws is controlled by a cam section $g$ on which the cam roll $76^a$ runs as the rock arm 38 is completing its backward movement under the control of the cam section $e$. As the roll $76^a$ moves along the cam section $g$ the spring 86 rocks the spindle 75 (Figs. 6 and 8), and through the connections heretofore described opens the jaws 71. The spring 86 is sufficiently powerful to overcome the tension of the spring 85 (Fig. 8) while opening the jaws. It will be seen that the opening of the gripping jaws takes place while the arm 38 is swinging backward in the manner above described.

Although the above description of operation is given as applied to a single bottle, it will be apparent that with plural molds, the plurality of bottles from each mold will be transferred and discharged simultaneously in the same manner as a single bottle. The stabilizing plate 90 is of special value in connection with plural molds, as it keeps the bottles separated, and particularly it prevents the upper bottle from swinging down and striking and marring the lower bottle.

Modifications may be resorted to within the spirit and scope of our invention.

What we claim is:

1. The combination of a travelling carriage and article transfer mechanism including an article holding device, means for causing said device to take hold of an article on the carriage, means for then moving said device relative to the carriage and carrying the article to a discharging position and releasing said article, and means for causing the transfer mechanism to advance with the carriage during the transfer operation, the movement of said article holding device relative to the carriage at the moment of releasing the article being in a direction opposite to the direction of movement of the carriage, the speed of said movement relative to the carriage being substantially equal to the speed of movement of the carriage, whereby the article is substantially stationary at the instant of release.

2. The combination of a travelling carriage and article transfer mechanism including an article holding device, means for causing said device to take hold of an article on the carriage, and means for then moving said device relative to the carriage and carrying the article to a discharging position and releasing said article, said transfer mechanism being mounted on the carriage to travel therewith, the movement of said article holding device at the moment of release of the article being in a direction substantially opposite to and at a speed substantially equal to the forward movement of the transfer mechanism with the carriage.

3. The combination of a travelling carriage, an article transfer mechanism mounted on the carriage to travel therewith and adapted to engage an article on the travelling carriage and transfer it to a discharge position spaced laterally from the path of travel of the carriage, said mechanism including an article holding device, means for actuating said device to cause it to take hold of an article on the carriage, means for causing said device to advance with the carriage while taking hold of said article, means for then moving said device and article laterally relative to the carriage to said discharge position and releasing the article, and means whereby said holding device is held substantially stationary or free from movement of translation while the article is being released therefrom.

4. The combination of a continuously travelling carriage, an article transfer mechanism mounted to travel therewith, said mechanism including a rock arm, an article gripping device carried at the outer end of said arm, means for causing said gripping device to grip an article on the carriage, means for then swinging said arm and carrying the article to a discharge position, and means for actuating the gripping device to release the article during said swinging of the arm, the movement of the gripping device relative to the carriage at the moment said article is released being in a direction substantially opposite to that in which the transfer mechanism is moving with the carriage.

5. The combination with a rotating mold carriage, of an article transfer mechanism mounted on the carriage to rotate therewith, said mechanism including a rock shaft, a rock arm attached to and extending forward from the rock shaft, an article gripping device carried on the forward end of said arm, means for causing said gripping device to grip an article on the carriage, means for then rocking said shaft and swinging said arm, gripping device and article outwardly and rearwardly, and means for actuating the gripping device to release the article during said rearward movement.

6. An article transfer mechanism comprising a rock shaft, a bracket secured to the rock shaft, means for rocking said shaft, a rock arm, means for pivotally connecting said rock arm to said bracket for swinging movement relative to the bracket, the axis of said swinging movement being inclined to the axis of said rock shaft, and an article gripping device carried by said rock arm.

7. An article transfer mechanism comprising a rock shaft, a bracket secured to the rock shaft, means for rocking said shaft, a rock arm, means for pivotally connecting said rock arm to said bracket for swinging movement relative to the bracket, the axis of said swinging movement being inclined to the axis of said rock shaft, a cam arranged to control the swinging movement of the rock arm relative to said bracket, and an article gripping device carried by said rock arm.

8. In a transfer mechanism, the combination of a rock shaft, means to rock said shaft, a rock arm, an article gripping device carried by the rock arm, and means providing an operating connection between the rock arm and rock shaft by which said arm is caused to rotate with the rock shaft and is similtaneously given a swinging movement relative to the rock shaft about an axis which is inclined to the axis of the rock shaft.

9. The combination of a rock shaft, a supporting member in which said shaft is journaled, means for rocking said shaft, a bracket secured to the rock shaft to rotate therewith, a frame pivotally connected to said bracket for rotation about an axis inclined to the axis of the rock shaft, a rock arm carried by said frame, an article gripping device carried by said arm, and means whereby rotation of the rock shaft causes a swinging movement of said arm and frame about said inclined axis.

10. The combination of a rock shaft, a supporting member in which said shaft is journaled, means for rocking said shaft, a bracket secured to the rock shaft to rotate therewith, a frame pivotally connected to said bracket for rotation about an axis inclined to the axis of the rock shaft, a rock arm carried by said frame, an article gripping device carried by said arm, means whereby rotation of the rock shaft causes a swinging movement of said arm and frame about said inclined axis, said last mentioned means including a cam mounted on said supporting member, and a cam roll carried by said frame and running on said cam.

11. The combination of a rock shaft, a supporting member in which said shaft is journaled, means for rocking said shaft, a bracket secured to the rock shaft to rotate therewith, a frame pivotally connected to said bracket for rotation about an axis inclined to the axis of the rock shaft, a rock arm carried by said frame, an article gripping device carried by said arm, means whereby rotation of the rock shaft causes a swinging movement of said arm and frame about said inclined axis, a spindle mounted concentrically with said rock shaft, a rod extending lengthwise of said arm, means for rotating said spindle, operating connections between said spindle and said rod, and operating connections between said rod and the article gripping device.

12. The combination of a travelling mold carriage and an article transfer mechanism mounted to travel therewith, said mechanism comprising a casing, a hollow rock shaft extending through the casing, a spindle extending through the rock shaft, rock arms connected respectively to said shaft and spindle, stationary cams for rocking said arms and thereby rocking the shaft and spindle, a transfer arm connected to the rock shaft, an article gripping device mounted on the transfer arm, mechanism for actuating the gripping device for gripping and releasing an article, operating connections between said spindle and said actuating mechanism, a spring connection between said rock shafts for holding said shafts in a predetermined relative position while free from the influence of said cams, a torsion spring connected to the rock shaft and said casing for rocking said shaft, and a stop to limit the rotative movement of the rock shaft in one direction when said shaft has been carried by the mold carriage beyond the influence of the cams.

13. The combination of a rotating mold carriage, a mold thereon arranged to hold an article in an upwardly and outwardly inclined position with the upper end portion of the article exposed, an article transfer mechanism mounted on the mold carriage, said mechanism comprising a gripping device including gripping jaws and means for causing said jaws to engage said exposed upper end of the article while the article is held by the mold in said inclined position, and means for causing said article gripping device to swing the article from said inclined position to an upright position and discharge the article while in said upright position.

14. The combination of a rotating mold carriage, a mold thereon arranged to hold an article in an upwardly and outwardly inclined position with the upper end portion of the article exposed, an article transfer mechanism mounted on the carriage, including a transfer arm, an article gripping device carried by said arm, means for swinging said arm and thereby moving the gripping device to a position above the inclined article, means for causing the gripping device to grip said exposed end portion of the article while the article is held by the mold in said inclined position, means for swinging said arm upwardly and outwardly while the article is held by and projecting downward from said gripping device and thereby swinging said article to an upright position beyond the mold carriage, and means for then actuating the gripping device to release the article.

15. The combination of a rotating mold carriage, a mold thereon arranged to hold an article in an upwardly and outwardly inclined position with the upper end portion of the article exposed, an article transfer mechanism mounted on the carriage, including a transfer arm, an article gripping device carried by said arm, means for swinging said arm and thereby moving the gripping device to a position above the inclined article, means for causing the gripping device to grip said exposed end portion of the article while the article is held by the mold in said inclined position, the gripping device comprising a pair of gripping jaws for engaging the article at a position below the top of the article, a stabilizing plate arranged to engage the upper surface of the article above the gripping jaws while the article is supported in the mold and co-operating with said jaws to prevent swinging movement of the article relative to said jaws when the article is released from the mold, means to swing the transfer arm in a path to swing said article to an upright position, and means for then releasing the article.

16. The combination of a rotating mold carriage, a mold thereon arranged to hold the article in an upwardly and outwardly inclined position, article transfer mechanism mounted on the carriage and comprising an inclined rock shaft, a horizontally disposed transfer arm, operating connections between said shaft and arm at one end of the latter, an article gripping device carried at the opposite end of said arm and including means to grip said article while in said inclined position, and means for rocking said shaft, said connection between the shaft and transfer arm including means for causing said arm to rotate with the rock shaft and simultaneously swing about an axis inclined to the rock shaft by which an upward and outward swinging movement is imparted to said arm and the article carried thereby is swung to an upright discharging position.

17. An article transfer mechanism arranged for movement in a closed substantially horizontal path, said mechanism including a transfer arm, an article gripping device carried by said arm, means for swinging said arm and thereby moving the gripping device to a position above an inclined article, means for causing the gripping device to grip the adjacent end of said article and hold it in fixed relation to said arm in an inclined position in which it projects downward from the gripping device, means for swinging the transfer arm in a path such that said article is carried thereby to an upright position beyond the position at which it was first engaged by the gripping device, and means for then actuating the gripping device to release the article.

18. An article transfer mechanism arranged for movement in a closed substantially horizontal path, said mechanism including a transfer arm, an article gripping device carried by said arm, means for swinging said arm and thereby moving the gripping device to a position above an inclined article, means for causing the gripping device to grip said article adjacent the upper end thereof, the gripping device comprising a pair of gripping jaws for engaging the article at a position below and adjacent the top of the article, a stabilizing plate arranged to engage the upper surface of the article above the gripping jaws and cooperate with said jaws in holding the article in an inclined position and preventing swinging movement of the article relative to the jaws, means to swing the transfer arm in a path by which the article is swung to an upright position, said article being held in fixed relation to said arm and depending from said jaws throughout said swinging movement of the article, and means for then releasing the article.

19. An article transfer mechanism arranged for movement in a closed substantially horizontal path, said mechanism including an inclined rock shaft, a horizontally disposed transfer arm, operating connection between said shaft and arm at one end of the latter, an article gripping device carried at the opposite end of said arm and including means to grip an article while in an inclined position, and means for rocking said shaft, said connection between the shaft and transfer arm including means for causing said arm to rotate with the rock shaft and simultaneously swing about an axis inclined to the rock shaft by which an upward and outward swinging movement is imparted to said arm and the article carried thereby is swung to an upright discharging position.

Signed at Alton, in the county of Madison and State of Illinois, this 25th day of November, 1929.

OLIVER C. K. HUTCHINSON.
WILLARD C. GILLHAM.